No. 659,912.  
J. W. BOWMAN.  
BUCKLE.  
(Application filed May 29, 1900.)

(No Model.)

Patented Oct. 16, 1900.

Witnesses  
Louis D. Heinrichs

Inventor  
John W. Bowman,  
By Victor J. Evans  
Attorney

UNITED STATES PATENT OFFICE.

JOHN W. BOWMAN, OF UNION STAR, MISSOURI.

BUCKLE.

SPECIFICATION forming part of Letters Patent No. 659,912, dated October 16, 1900.

Application filed May 29, 1900. Serial No. 18,428. (No model.)

*To all whom it may concern:*

Be it known that I, JOHN W. BOWMAN, a citizen of the United States, residing at Union Star, in the county of De Kalb and State of Missouri, have invented certain new and useful Improvements in Buckles, of which the following is a specification.

My invention relates to improvements in buckles of that class or style wherein a bail is employed as the means for securing and retaining the free or detachable end of the strap or material to which the buckle is connected.

The object of my invention is to provide a simple, inexpensive, and reliable device to permit the easy and free movement of the strap and allow the same to be expeditiously released and securely fastened. The means by which I accomplish this object will be fully described hereinafter and the novelty thereof particularly pointed out in the claims.

I fully and clearly illustrate my invention in the accompanying drawings, wherein—

Figure 1:
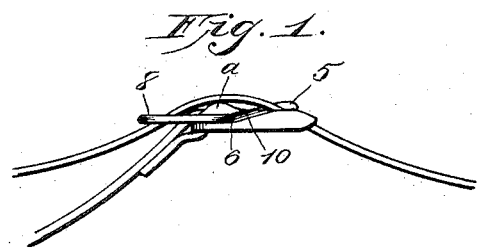
Figure 2:
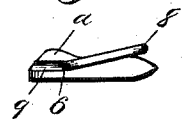
Figure 3:
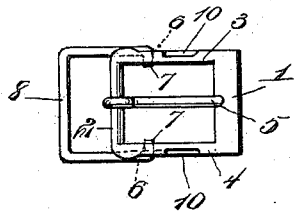

Figure 1 is a side view of my device, showing the buckle closed and the strap held in place. Fig. 2 is a side view of the buckle, showing the bail in upturned position to allow the easy withdrawal of the strap. Fig. 3 is a plan view showing the bail in the turned-down position, as in Fig. 1, the strap being removed.

Referring to the drawings, 1 designates the frame of the buckle, preferably rectangular in form and consisting of front and rear bars 1 2 and side bars 3 4, formed integral with the end bars. Upon the rear bar 2 is pivotally secured the tongue 5 in the usual way.

In the side bars of the buckle-frame and in advance of the rear bar 2 are formed oppositely-arranged and alining bearing-holes 6 6, in which the inward ends 7 7 of a bail 8 are pivotally disposed, so that the bail may be readily swung from a holding to a released position. In order that the bail may be held in locked or clamped position on the detachable end of the strap, I form horizontal grooves 9 9 in the outer side faces of the frame, which grooves extend from the pintle-bearings of the bail to the inner end of the side bars of the frame, and in order that the bail may snap into the grooves with sufficient tension I reinforce the side bars of the buckle, as at $a$, and make the upper face edge portions above the grooves cam-shaped or inclined, so that when the bail is turned down the side bars thereof will be spread and on reaching the grooves will spring into the grooves and there be held with sufficient rigidity to hold the strap down, as in an ordinary bail or keeper. In order to hold the bail securely in position when turned down over the buckle to release the strap, I provide the outer faces of the side bars 3 4 with grooves 10, adapted to receive and retain the bail.

The manipulation and operation of my improved buckle will be readily understood from the foregoing description, taken in connection with the illustrations of the same in the drawings; but they may be explained as follows: To connect the free end of the strap to the buckle, the bail is turned up, as indicated in Fig. 2 of the drawings, and the strap is passed through the buckle over the front bar in the usual well-known manner until the desired tension is attained, when the tongue of the buckle is engaged in a hole of the strap, and the loose end portion of the strap is passed under the bail until straightened out, when the bail is turned down until it snaps into the side grooves, in which position it is held and serves all the purposes of the ordinary keeper, and in addition thereto being more conveniently manipulated when it becomes desirous or necessary to loosen the buckle, since all that is necessary to accomplish that is to turn the bail upward and the strap is free from its pressure and grip ready to be pulled forward in position for unbuckling.

The improved buckle as above described is adapted for use with harness and in any place where a buckle is required to secure a strap.

I claim—

1. A buckle comprising a rectangular frame; a tongue pivotally secured thereto; a bail pivotally attached to the frame; and means for locking the bail in engagement with the sides of the frame.

2. A buckle, comprising a rectangular frame; a tongue pivotally secured thereto; a bail pivotally attached to the frame and means for locking the sides of the bail in engagement with the outer sides of the frame.

3. A buckle consisting of a suitable frame having side bars formed with bearings adjacent to their rear portions and longitudinal grooves in their outer faces, leading from the bearings to the rear ends thereof; and a bail pivotally supported in the bearings of the frame and adapted to be turned down and snapped into the grooves in the said side bars.

4. A buckle consisting of a frame having side bars formed with bearings, and grooves extending longitudinally in their outer faces from said bearings to the rear end of the frame, and having cam-surfaces leading to said grooves, and a bail pivotally supported in said bearings and adapted to swing down over the cam-surfaces and lodge in the longitudinal grooves.

5. A buckle, comprising a frame having side bars, formed with bearings, grooves extending longitudinally in their outer faces from said bearings to the rear end of the frame, adapted to receive and retain the bail when turned down over the strap, cam-surfaces leading to said grooves, grooves in the outer faces of the side bars adapted to receive and retain the bail when turned over upon the buckle, and a bail pivotally supported in the bearings in the frame.

In testimony whereof I affix my signature in presence of two witnesses.

JOHN W. BOWMAN.

Witnesses:
WM. P. HUDSON,
JESSE M. BOWMAN.